(12) United States Patent
Schwan et al.

(10) Patent No.: US 7,698,737 B2
(45) Date of Patent: Apr. 13, 2010

(54) TAMPER-RESISTANT CONTROL UNIT

(75) Inventors: Olaf Schwan, Munich (DE); Hubert Uebelacker, Munich (DE); Marc Lindlbauer, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 764 days.

(21) Appl. No.: 10/480,301

(22) PCT Filed: Jun. 11, 2002

(86) PCT No.: PCT/EP02/06399

§ 371 (c)(1),
(2), (4) Date: May 12, 2004

(87) PCT Pub. No.: WO03/001348

PCT Pub. Date: Jan. 3, 2003

(65) Prior Publication Data

US 2004/0187035 A1 Sep. 23, 2004

(30) Foreign Application Priority Data

Jun. 12, 2001 (DE) .................................. 101 28 305

(51) Int. Cl.
- *H04L 29/06* (2006.01)
- *G06F 12/14* (2006.01)
- *G06F 17/30* (2006.01)
- *G06F 12/00* (2006.01)
- *G08B 21/00* (2006.01)
- *H04L 17/02* (2006.01)
- *H04Q 5/22* (2006.01)
- *H02B 1/20* (2006.01)
- *H02B 1/00* (2006.01)

(52) U.S. Cl. .......................... 726/19; 713/151; 713/155; 713/165; 713/187; 713/194; 726/4; 726/34; 726/35; 380/52; 340/10.51; 361/654; 361/672

(58) Field of Classification Search ................... 726/19, 726/34; 713/194; 361/654, 672
See application file for complete search history.

(56) References Cited

U.S. PATENT DOCUMENTS 4,691,350 A * 9/1987 Kleijne et al. ............... 713/194

(Continued)

FOREIGN PATENT DOCUMENTS

DE 195 12 266 A 3/1996

(Continued)

*Primary Examiner*—William R Korzuch
*Assistant Examiner*—Aravind K Moorthy
(74) *Attorney, Agent, or Firm*—Rothwell, Figg, Ernst & Manbeck, p.c.

(57) ABSTRACT

A control unit is described for technical installations, devices and/or machines having a microprocessor, a programmable memory and a housing enclosing the microprocessor and programmable memory. Data lines lead out of the housing for connection with an external device for writing data to the programmable memory. The control unit is enclosed in the housing such that the operability of the control unit is at least partly destroyed when the housing is opened. The control unit furthermore has a check device that checks for authorization a write access by which data are written to the programmable memory over the data line, and causes the data to be written to the programmable memory only in case of a successful check of authorization.

7 Claims, 1 Drawing Sheet

U.S. PATENT DOCUMENTS

| | | | | |
|---|---|---|---|---|
| 5,469,557 A * | 11/1995 | Salt et al. | | 711/103 |
| 5,592,555 A * | 1/1997 | Stewart | | 380/247 |
| 5,748,084 A * | 5/1998 | Isikoff | | 340/568.1 |
| 5,876,304 A * | 3/1999 | Takiguchi | | 477/150 |
| 5,892,906 A * | 4/1999 | Chou et al. | | 726/19 |
| 6,167,519 A * | 12/2000 | Sonobe | | 726/20 |
| 6,301,670 B1 * | 10/2001 | Motoyama et al. | | 713/300 |
| 6,374,354 B1 * | 4/2002 | Walmsley et al. | | 713/167 |
| 6,480,096 B1 * | 11/2002 | Gutman et al. | | 340/5.31 |
| 6,539,480 B1 * | 3/2003 | Drews | | 713/191 |
| 6,553,494 B1 * | 4/2003 | Glass | | 713/186 |
| 6,609,656 B1 * | 8/2003 | Elledge | | 235/382 |
| 6,715,078 B1 * | 3/2004 | Chasko et al. | | 713/193 |
| 6,804,699 B1 * | 10/2004 | Henrie | | 709/203 |
| 6,832,320 B1 * | 12/2004 | Broyles et al. | | 726/18 |
| 6,925,562 B2 * | 8/2005 | Gulcu et al. | | 713/172 |
| 6,950,946 B1 * | 9/2005 | Droz et al. | | 726/35 |
| 6,983,378 B1 * | 1/2006 | Kokubo | | 726/26 |
| 7,093,139 B2 * | 8/2006 | Silverbrook et al. | | 713/194 |
| 7,095,855 B1 * | 8/2006 | Collins | | 380/241 |
| 7,124,170 B1 * | 10/2006 | Sibert | | 709/216 |
| 7,430,668 B1 * | 9/2008 | Chen et al. | | 713/187 |
| 2002/0002683 A1 * | 1/2002 | Benson et al. | | 713/194 |
| 2002/0038296 A1 * | 3/2002 | Margolus et al. | | 707/1 |
| 2002/0099950 A1 * | 7/2002 | Smith | | 713/200 |
| 2002/0104004 A1 * | 8/2002 | Couillard | | 713/178 |

FOREIGN PATENT DOCUMENTS

EP      0 455 174 A      11/1991

* cited by examiner

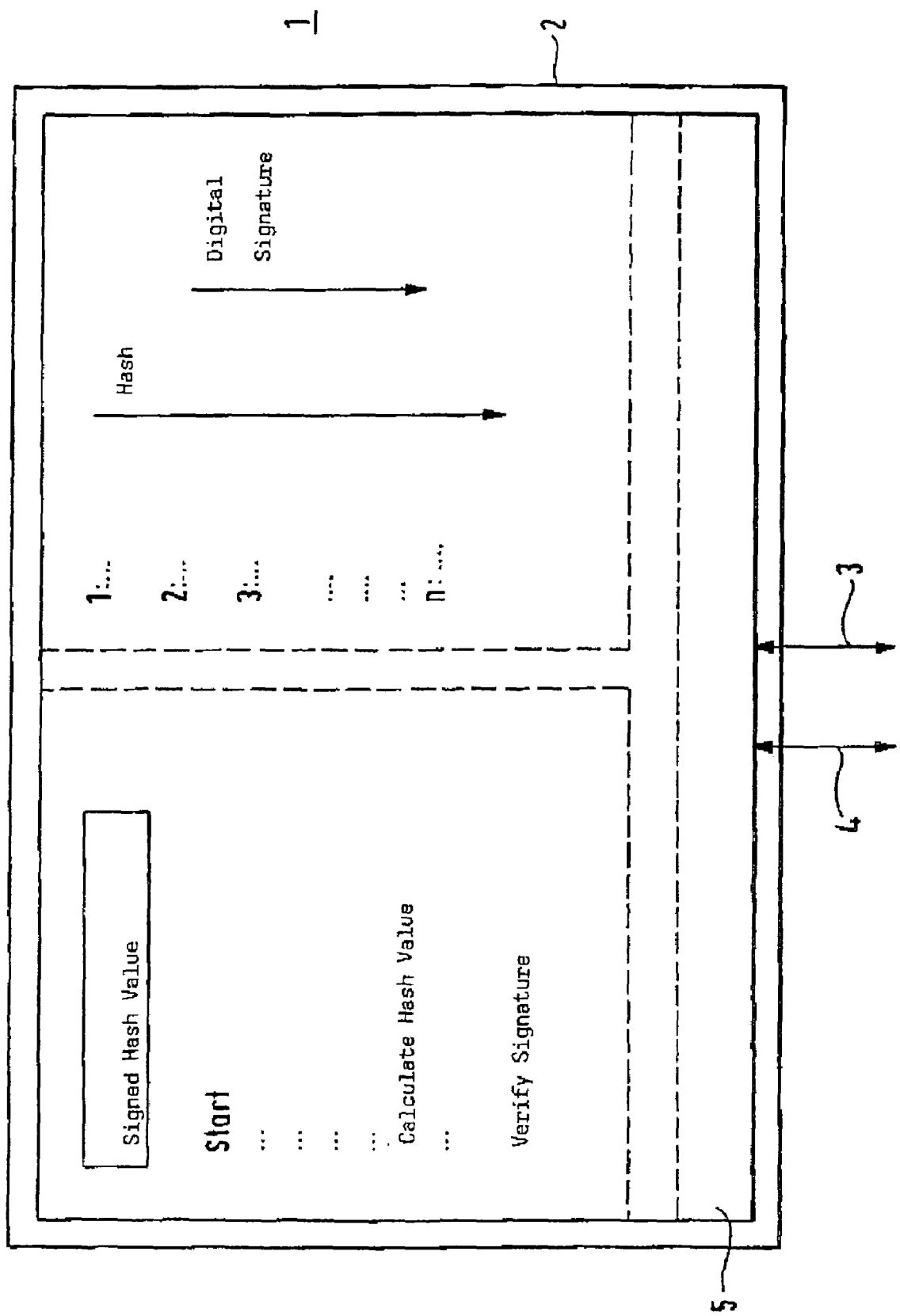

TAMPER-RESISTANT CONTROL UNIT

CROSS-REFERENCE TO RELATED APPLICATION

This application is a 371 of PCT Application Serial No. PCT/EP02/06399, filed Jun. 11, 2002.

BACKGROUND OF THE INVENTION

1. Field of the Invention

This invention relates to a control unit for technical installations, devices and/or machines having a microprocessor, a programmable memory, a housing and at least one data line leading out of the housing for connection with an external device for writing data to the programmable memory.

2. Description of the Background Art

Such control units based on microcontrollers are meanwhile used in a great number of machines and devices, for example in automobiles or consumer electronics, etc. The control program required by the microprocessor is usually deposited in a programmable memory. In many cases, said memory is at least partly a freely programmable, erasable and overwritable memory. The control unit can then be adapted anytime to customer and application needs by changing the required data and optionally also complete program runs. This subsequent change also allows in particular later improvement or updating of the control program. In particular, it is thus possible to change the control software to subsequently modify for example the functional and/or performance range of the control unit and thus the entire technical installations of the device or machine. Reprogramming is usually done by connecting an external device to a data line leading out of the housing and then writing the required data to the programmable memory over the data line. The external device is often a special device for programming the particular control device. However, it can also be a commercial computer provided with special software for programming the control unit. The data lines can be data lines specially provided for programming that allow a write access to the programmable memory. However, they can be data lines also used by the control unit for controlling the technical installation and/or machine, i.e. data lines having a double function.

A disadvantage of a later possibility of changing the control software is that unauthorized persons can abuse said possibility and for example illegally modify the functional and/or performance range of the control unit subsequently and thus "tune" the entire technical installation or machine. This has firstly the disadvantage for manufacturers that they could suffer losses through tuning-induced damage in the period of guarantee and the resulting costs. Additionally, the product differentiation features can be changed by unauthorized persons subsequently to such an extent as to lastingly interfere with the particular manufacturer's trademark positioning and trademark policy.

SUMMARY OF THE INVENTION

It is the problem of the present invention to develop a control unit of the above-mentioned kind so that it can be modified anytime by authorized entities while at the same time ensuring good tamper protection from unauthorized changes.

The inventive solution is based on the combination of two protective components.

Firstly, the control unit is encapsulated by the housing such that an opening of the control unit in any way, for example by screwing or milling, is largely prevented by any opening of the housing encapsulation automatically involving destruction of the operability of the control unit. This is possible for example through corresponding adhesive techniques. Both destruction of essential hardware components and erasure of software parts at least important for operability can be involved. It is then no longer possible to open the unit and solder out corresponding memory chips or analyze codes to analyze, reveal or evade security measures present within the control unit and then close the control unit again and use it in the modified form. "Tuning" of the control unit is then possible, if at all, over the data lines.

To prevent this, the control unit secondly has a check device that checks for authorization write accesses by which data are written to the programmable memory over the data lines. That is, every process that tries to access data of the control unit over the data lines by writing and/or reading from outside over the data lines must undergo an authorization check by such a "watchdog process." Only in case of a successful authorization check is reading/writing of data from or to the programmable memory effected, i.e. the check device permits writing and/or reading of data or does so itself.

Since all data are thus canalized and checked for authenticity, no unauthorized tuning over the data lines is possible. Since the housing is accordingly encapsulated physically, this process cannot be evaded either.

Such a check device is preferably integrated within the microprocessor and in the programmable memory itself in the form of a software process. Alternatively, it is possible to place a separate security module having such a check device in the housing, independently of the microprocessor and programmable memory, and to connect it to the data lines like a kind of filter.

There are different general possibilities for carrying out the check of data.

One possibility is to use an algorithm or keyword to be kept secret. A write access is permitted only if authenticity was previously detected by certain information, e.g. by input of a PIN, or by dynamic variable authentication by a challenge-response method. In an especially simple case, the check device has only a memory with a secret check word and a comparing device. A keyword is then transferred to the control device over a data line for an authorization check and said keyword compared with the check word before every write access.

In a preferred embodiment, the control unit is encapsulated in the housing such that, if the housing is opened, memory areas containing a secret check word and/or secret key and/or secret encryption algorithm are erased and/or destroyed so that it is no longer possible to read out said data or algorithms after the housing is opened. This has the advantage that for example the same secret keys or methods can be used for a whole series of control units, without there being a danger of an unauthorized person opening a control unit of said series and deliberately accepting the destruction of operability in order to obtain knowledge of the secret keys or methods, which can then be used for illegally modifying other control units of the same kind.

In another preferred alternative, authentication is done not using secret algorithms but using published or publishable cryptographic methods. The authentication process is done using said methods so that security is now dependent exclusively on the particular keys used. The security of the entire system, i.e. of the tamper protection of the control device, is thus distributed over the security of the key management processes. For adequately secure handling of said keys there are sufficient commonly known methods. The use of such publishable cryptographic methods has the advantage over secret algorithms that the implemented security cannot be avoided simply by knowing the algorithms, as is the case e.g. with a trivial password input.

Examples of such published cryptographic methods are symmetric cryptographic methods such as DES, 3-DES or IDEA, and asymmetric cryptographic methods such as the RSA method, in which the encryption algorithm is based on the arithmetic of large integers and the keys are generated on the basis of two large prime numbers.

The use of such a control unit offers a particular advantage for controlling an automobile engine for example. With such control devices it is also important for reasons of road safety to prevent unauthorized tuning of the control units and thus the engines. Furthermore, unauthorized tuning can lead here to premature damage to engines or transmissions within the period of guarantee, which in turn means relatively great damage to the vehicle manufacturer. On the other hand, there is au especially great interest on the part of users particularly on this market to obtain higher engine power by such tuning.

The invention allows, at the same time as utmost tamperproofness, a change of programming anytime on presentation and checking of authorization, for example an electronic certificate and/or a biometric feature, etc. Thus, it is possible anytime for an authorized entity, such as the manufacturer or a licensed user of the control unit, to release, modify or import diverse contents such as city maps, pieces of music or the like as well as to completely change the program code.

The possible change of data or the program code within the control unit by an authorized person while at the same time safely preventing tampering also has the advantage that for example only temporary changes can be made which are automatically reset after a predetermined time period, for example after expiration of a certain additional license. In this way it is e.g. possible to rent or recharge power in the automobile for a limited time. Likewise, in control devices for navigation systems it is possible to rent temporarily for a certain trip geographical data on the regions to be crossed, i.e. maps of cities or regions, whose data are no longer available to the navigation system after expiration of a given time after the end of the trip.

In particular for changes of the control software for automobiles, for example, it might be necessary to obtain authorization or release by a third authority, for example the motor vehicle licensing office, before making the changes. For this purpose a connection is initiated before or after the authorization check by the check device to the external authorizing office, which releases the control software to be installed.

BRIEF DESCRIPTION OF THE DRAWING

The invention will hereinafter be explained in more detail by an embodiment with reference to the enclosed FIGURE.

The single FIGURE shows a schematic block representation of control unit 1 for an automobile engine (not shown).

DETAILED DESCRIPTION OF THE INVENTION

Control unit 1 first has encapsulated housing 2 containing a microprocessor with a programmable memory storing program data and wanted data including the tuning-relevant parameters of the engine such as boost pressure. Housing 2 is closed such that any opening leads to irreversible destruction of the operability of the control unit. Over data lines 3, 4 it is possible to access the programmable memory and overwrite the programs or data therein.

Furthermore, control unit 1 has check device 5 for checking all data coming in through data lines 3, 4 as a "watchdog" and thus checking each write access for authenticity.

The check device is shown in the FIGURE as a block within the control unit. Check device 5 is in reality implemented within the microprocessor in the programmable memory as a software process. The microprocessor and programmable memory themselves are not shown in the FIGURE.

In the shown embodiment, check device 5 works by means of a digital signature, by which a hash value is first calculated over the entire data string to be written to memory. Said hash value is encrypted before transfer over one of data lines 3, 4 with any desired, preferably asymmetric cryptoalgorithm, here an RSA method. The result of said calculation is added to the actual message as a "signature," i.e. attached to the data suing.

Within control unit 1, check device 5 then causes a hash value to be compressed over the real data string with the same hash algorithm as on the writing device side. The attached digital signature is decrypted with the public key of the RSA algorithm and the added hash value of the signature contained during decryption compared with the hash value calculated within the control unit. If the two values match, the message was not changed on its transmission path and generated by a device in possession of the right secret key. The signature has thus been verified and the data authenticated. If the two values do not match, either the message or the signature was changed during transmission. Thus, no authenticity is given and the content of the message cannot be assumed to have been sent unchanged or by an authenticated person. The sent data string is accordingly not accepted by the check device and consequently not written to memory, as desired by the user of the device for programming control unit 1. This check process is shown as program code on the top left in check device 5. The data string itself and the formation of the hash value and signature are shown on the top right within check device 5.

Since the housing encapsulation makes it impossible to evade the digital signature by an unauthorized person opening the housing and writing the desired data directly to the particular locations in the memory, the tamper protection on and in the control unit is effectively increased by the invention. Thus, no unwanted guarantee claims arise for the companies concerned. The particular companies' trademark strategy is no longer undermined. Moreover, the life of the technical installations and/or devices or machines driven by the control unit is increased in relation to illegally changed devices. In addition, subsequent changes or extensions in the behavior of the control unit are possible anytime permanently or only temporarily, so that flexible and dynamic adaptation to the changing requirements of technology, markets and customers can be guaranteed.

The invention claimed is:

1. A machine control unit operatively connected to a technical machine for controlling said technical machine, comprising:

a microprocessor;

a programmable memory including a control program required by the microprocessor;

a housing encapsulating at least the programmable memory;

at least one data line leading out of the housing for connection with an external device for writing data, reading data, or a combination thereof, to or from the programmable memory; and an authorization check device to check for authorization of a write access, read access, or a combination thereof, by which data are written to the programmable memory or read therefrom over the data line, and to cause the data to be read from/written to the programmable memory only in case of a successful check of authorization, whereas said data to be read from/written to the programmable memory relate to changes or extensions in behavior of the machine control unit;

wherein the behavior of the machine control unit controls operation of said technical machine, wherein the machine control unit is encapsulated in the housing such that the operability of the machine control unit is at least partly irreversibly destroyed, by destruction of essential hardware components or erasure of software parts important for operability of the machine control unit, when the housing is opened, and wherein the authorization check device includes means for establishing a connection to a third authority and causes the data to be read from/written to the programmable memory only when read/write access has been released by said third authority.

2. A machine control unit according to claim 1, characterized in that the authorization check device comprises a memory with a secret check word and a comparing device for comparing with said check word for an authorization check a keyword transferred to the control device over a data line before a write access.

3. A machine control unit according to claim 1, characterized in that the authorization check device comprises means for carrying out a challenge-response method for an authorization check.

4. A machine control unit according to claim 1, characterized in that the authorization check device comprises means for encryption of data, decryption of data, or a combination thereof.

5. A machine control unit according to claim 1, characterized in that the authorization check device comprises means for checking a digital signature of the control related data transferred over the data line.

6. A machine control unit according to claim 1, characterized in that the device control unit is encapsulated in the housing such that memory areas containing at least one of a secret check word, secret key and secret encryption algorithm are erased, destroyed, or both, when the housing is opened.

7. A method for controlling an automobile engine, comprising providing a machine control unit according to claim 1, operatively connected to an automobile engine, for controlling said automobile engine.

* * * * *